Patented Apr. 29, 1947

2,419,877

UNITED STATES PATENT OFFICE 2,419,877

PROCESS OF IMPROVING AND PRESERVING FOOD PRODUCTS

Clarence Birdseye, Gloucester, Mass., assignor to Dehydration, Inc., Gloucester, Mass., a corporation of Massachusetts No Drawing. Application October 16, 1943, Serial No. 506,576

7 Claims. (Cl. 99—192)

This invention consists in a novel process of improving and preserving food products which is characterized by the combination of dehydrating and freezing steps.

It is well known that fruit tissues and cell contents are, to a considerable extent, broken down and denaturized in freezing, and that when frozen fruit is subsequently thawed, leakage of original liquid contents is high and accompanied by more or less collapse of the tissue. This objectionable effect has heretofore been offset to some extent in freezing, for the retail trade, such products as strawberries by slicing the berries and mixing the slices with sugar before packing and freezing, thus causing sugar syrup to penetrate readily into, and consequently to harden, the tissue, but of course, by such procedure the appearance of the original whole fruit is entirely lost by the slicing operation which is necessary in order that the surface area exposed to osmosis may be sufficient in extent.

The cold-packing fruit industry is very extensive and deals in all sorts of berries, cherries, and sliced fruits. In the cold-pack process, the fruit units are placed in large containers (usually 30-pound cans or 450-pound wooden barrels), well mixed with one part of sugar to each two, three, four or five parts of fruit, and then frozen slowly in low-temperature rooms. Osmosis takes place slowly before, during, and after freezing, and when the package is thawed for use in making jams, crushed fruits, pies, etc., a very large percentage of juice results. This is highly undesirable, and the price obtainable for the frozen product varies inversely with the amount of leakage which has taken place during freezing, storage, and thawing.

Even when fruit is frozen rapidly by immersion in brines, syrups, or combinations thereof, serious difficulty is encountered because, through osmosis, the fruit loses water, coloring matter, and flavor to the liquid refrigerant, which thereby becomes progressively contaminated and diluted, making reconcentration of the refrigerant necessary periodically.

I have discovered that if comestibles, and particularly fruits, are first partially dehydrated and then frozen by immersion in a low-temperature freezing solution, the partially dehydrated comestibles will much more readily absorb the refrigerent solution and will not give up any considerable proportion of their own ingredients to the liquid refrigerant. For example, if ripe strawberries are dehydrated by the removal of about one-third of their liquid content, they will absorb a substantial quantity of a sugar syrup into which they may be placed before or during freezing, and will not give up to that syrup any substantial portion of their own moisture, flavor, or coloring. The resulting frozen product (having lost little besides water during dehydration and having had that water largely replaced by the liquid refrigerant during freezing) retains to a very large degree its original color, texture, shape, and size even after being completely thawed.

The direction, nature (whether by absorption, osmosis, or a combination thereof), and amount of the interchange of ingredients between the freezing liquid and the food product immersed therein may be controlled by varying the percentage of water evaporated from the comestible and the ingredients and concentration of the freezing liquid in which the said comestible is immersed. In the case of fruit having outer skins that are highly moisture resistant, such as cherries and plums, the skins may be punctured before dehydration so that moisture vapor can more readily escape from the fruit in the dehydrating process.

Those fruits, such as apples or peaches, which are subject to deleterious enzymic changes during dehydration, freezing, and storage, should be treated before dehydration to inactivate their enzyme content. This inactivation may be readily accomplished by blanching or sulphurizing. The dehydration step may be carried out either in partial vacuum, in an inert atmosphere, or in any other way appropriate to the comestible being processed and the product which it is desired to obtain.

My novel process of partial dehydration followed by freezing makes possible a whole new field of food product blending. For example, fruits or vegetables may be partially dehydrated and then caused to absorb—before, during or after freezing—a solution containing coloring matter, flavoring ingredients, anti-oxidants of any sort, minerals, or viatmins. For example, partially dehydrated strawberries may be immersed and frozen in a raspberry or pineapple syrup and so made to acquire a mixed or intensified flavor. Strawberries or other fruits, either sliced or whole, may be immersed and frozen in grenadine syrup and thus given an attractive coloring. Partially dehydrated apple slices may have their flavor fortified by the addition of highly valuable aromatic esters, or other ingredients, from fruits other than apples, or partially dehydrated fruits may be made to absorb, before, during or after freezing, a concentrate made from the skins, seeds, juices, or other parts of similar or dissimilar fruits.

Partially dehydrated carrots may be fortified by soaking, prior to freezing, in a liquid containing carotene and wheat germ to enhance their color, flavor, and vitamin value, and to retard oxidation during storage. Partially dehydrated animal or fish flesh may be caused to absorb iron, sulphur, calcium, or iodine salts from solutions containing these elements in suitable form; or partially dehydrated fish flesh of low intrinsic flavor may be caused to absorb clam or oyster extract while in process of freezing. Gelatine, beef extract, and sugars of all types may be introduced into partially dehydrated food products in the same manner.

I have enumerated a very limited number of specific examples in the wide field of use of my invention and have done so for purpose of illustration and without in the least intending to limit its application either to the comestibles named or the liquid refrigerant solution to be employed.

Any commercial or convenient form of dehydrating apparatus may be used for carrying out the first step of my novel process, such for example as that disclosed in my pending application Ser. No. 456,903, filed September 1, 1942. In that apparatus the product to be dehydrated is passed back and forth on conveyor belts while being subjected to radiant heat, heat supplied by conduction from supporting surfaces, and heat supplied by convection from currents of dehydrating gas or air.

While it is desirable from many standpoints to quick freeze comestibles in carrying out my novel process, many advantages thereof may be realized even when the freezing step is carried out at a slower rate, as by sharp freezing. In quick-freezing the fruit or berries, for example, it may be desirable to employ a liquid refrigerant which will not separate out any solid above 15° F., and to that end I may employ an invert sugar solution, a sugar solution high in levulose, or a solution of other types of sugar capable of maintaining its fluidity without separation at low temperatures. In such circumstances the surface of the fruit freezes quickly and thus provides an effective seal against loss of any ingredients absorbed prior to freezing.

If desired, one step further may be taken, viz. the product frozen in the manner above indicated may be enclosed in a substantially moisture-proof covering such as transparent moistureproof Cellophane.

Having thus disclosed my invention and described in detail several examples of its application, I claim as new and desire to secure by Letters Patent:

1. The process of preserving and improving moisture-containing food products, which includes the steps of first dehydrating the product to remove a substantial fraction of its original moisture content, then immersing the partially dehydrated product in a liquid refrigerant containing a flavoring ingredient, thereby freezing the product with an accretion of moisture content and flavoring ingredient and in substantially the natural shape of the fresh product.

2. The process of preserving and improving moisture-containing food products, which includes the steps of first dehydrating the product to remove a substantial fraction of its original moisture content, then causing the product to absorb moisture by immersing the partially dehydrated product in a liquid refrigerant containing an anti-oxidant, thereby freezing the product with an accretion of anti-oxidant and in substantially the natural shape of the fresh product.

3. A process for preserving fruits which includes the steps of treating the fruit to inactive enzymes, removing water from the fruit by evaporation, replacing at least a part of said moisture with a solution having a preservative effect, and freezing said fruit, thereby producing a frozen product of substantially the same shape as the natural fresh fruit.

4. A process of preserving fruits while maintaining substantially their natural appearance, including the steps of first partially dehydrating a fruit, subsequently causing the partially dehydrated fruit to absorb a solution of edible liquid, and then freezing the fruit, thereby producing a frozen product which when thawed will possess substantially the same shape and moisture content as the natural fresh fruit.

5. In a process of preserving moisture-containing food units while maintaining substantially their natural appearance, the steps of partially dehydrating the food units, subsequently causing the partially dehydrated units to absorb a solution of edible liquid, and freezing the units thus treated in the edible liquid refrigerated to serve as a refrigerating medium, thereby producing a frozen product of substantially the same shape and moisture content as the original food units.

6. A process of preserving moisture-containing comestibles while maintaining substantially their natural appearance, which includes the steps of first partially dehydrating one kind of comestible, subsequently causing the partially dehydrated comestible to absorb the juice of another kind of comestible, and then refrigerating the combined comestibles thereby producing a frozen product of substantially the same appearance and moisture content as the original comestible.

7. A process of preserving berries while maintaining substantially their initial appearance, which includes the steps of first dehydrating the berries by removing approximately one-third of the water content of the natural fresh berries, and then freezing the dehydrated berries in a liquid refrigerant comprising an edible solution of a concentration such that the berries will not give up to the solution any substantial portion of their own moisture, flavor or coloring and will themselves absorb moisture from the solution, thereby producing frozen berries of substantially the same shape and moisture content as the natural fresh berries.

CLARENCE BIRDSEYE.

REFERENCES CITED

The following references are of record in the file of this patent:

UNITED STATES PATENTS

| Number | Name | Date |
|---|---|---|
| 2,317,397 | Noyes | Apr. 27, 1943 |
| 2,004,354 | Tierney | June 11, 1935 |
| 2,094,314 | Wiggins | Sept. 28, 1937 |
| 1,198,174 | Waldon | Sept. 12, 1916 |
| 1,089,215 | Heine | Mar. 3, 1914 |